(12) United States Patent
Grüber (10) Patent No.: US 8,580,007 B2
(45) Date of Patent: Nov. 12, 2013

(54) FILTER SYSTEM FOR CLEANING THE AIR OF AN ENCLOSURE TO BE VENTILATED, ESPECIALLY FOR FIBER-OPTIC EQUIPMENT

(75) Inventor: Jens Grüber, Suhl (DE)

(73) Assignee: ADVA Optical Networking SE, Meiningen (DE)

( * ) Notice: Subject to any disclaimer, the term of this patent is extended or adjusted under 35 U.S.C. 154(b) by 62 days.

(21) Appl. No.: 13/315,183

(22) Filed: Dec. 8, 2011

(65) Prior Publication Data

US 2012/0227365 A1 Sep. 13, 2012

(30) Foreign Application Priority Data

Mar. 11, 2011 (EP) .................................... 11401043

(51) Int. Cl.
*B01D 46/00* (2006.01)
(52) U.S. Cl.
USPC ............. 55/385.2; 55/385.6; 55/357; 55/481; 55/504; 55/506
(58) Field of Classification Search
USPC ......... 55/385.6, 498, 357, 521, 529; 454/184, 454/192; 95/273; 210/232
See application file for complete search history.

(56) References Cited

U.S. PATENT DOCUMENTS 6,297,950 B1 10/2001 Erwin
8,066,790 B2 * 11/2011 Hutchinson et al. ............ 55/498
2003/0079449 A1 * 5/2003 Jones ........................... 55/385.6
2008/0236393 A1 * 10/2008 Heller et al. ..................... 95/273
2009/0288439 A1 * 11/2009 Ihle et al. ......................... 62/317

FOREIGN PATENT DOCUMENTS

EP 1 947 547 A1 7/2008
EP 2 292 310 A1 3/2011

OTHER PUBLICATIONS

EPO, Extended European Search Report issued Jul. 21, 2011 in corresponding European patent application No. 11401043.2 (5 pages).

* cited by examiner

*Primary Examiner* — Duane Smith
*Assistant Examiner* — Minh-Chau Pham
(74) *Attorney, Agent, or Firm* — The Culbertson Group, P.C.

(57) ABSTRACT

The invention relates to a filter system for cleaning the air of an enclosure to be ventilated, especially for fiber-optic equipment. The enclosure includes a ventilation opening and is associated with an insertion shaft located proximate to the ventilation opening. The filter system includes an insertion part including a filter housing for accommodating at least one filter element and further including a handle for inserting the insertion part into the insertion shaft. The filter housing is configured so as to cover the ventilation opening when the filter housing is in a working position within the insertion shaft. The filter system includes an insertion arrangement provided at a first end portion of the insertion shaft for inserting the insertion part into the insertion shaft.

15 Claims, 6 Drawing Sheets

FILTER SYSTEM FOR CLEANING THE AIR OF AN ENCLOSURE TO BE VENTILATED, ESPECIALLY FOR FIBER-OPTIC EQUIPMENT

TECHNICAL FIELD OF THE INVENTION

The present invention relates to a filter system for cleaning the air of an enclosure to be ventilated, especially for fiber-optic equipment, the enclosure including a ventilation opening and being associated with an insertion shaft located proximate to the ventilation opening. Further, the invention relates to an enclosure which includes a filter system.

BACKGROUND OF THE INVENTION

Especially in casings for fiber-optic equipment there is often the need to change the filter element of an air filter system of the casing without moving fiber-optic cables or pigtails which are connected to fiber-optic jacks provided at a front plane of the casing. Each movement of a fiber-optic cable may change the transmission characteristics of the respective transmission link, especially the attenuation of the link due to a small bending radius. Also, if actions like changing filter elements are carried out by untrained personnel, there is a risk that the fiber-optic connectors received in respective jacks at the front plane are torn out or the cables are treated such that the fibers break, both resulting in a complete loss of signal in the respective transmission link. As the enclosure of a fiber optic equipment is usually kept as small as possible in order to save space, the respective front panel is usually rather small, which results in a correspondingly small space for connecting fibers or cables right in front of the panel, as often the casings of fiber-optic equipment are stacked one over the other in a mounting rack.

Often, the fiber-optic connecting cables are guided essentially horizontally in front of the panel to the right or left of the casing. Further, the air filter systems are often designed such, that the housing for the air filter element can be accessed from the front panel in order to change the filter element. In these embodiments for an air filter system, the ventilation opening of the casing is usually provided in the left or right side wall of the casing, the ventilation opening having a sufficiently large area and also a height that often extends over almost the entire height of the casing or at least over a considerable part of the height thereof. As a result, the air filter element covering the whole ventilation opening and the filter housing accommodating the filter element also extend over this part of the height of the casing. If in front of the air filter system the fiber-optic connecting cables are to be guided to the respective side of the casing or rack, it is, practically impossible in case of known air filter systems to pull the filter housing out from the casing without moving aside the fiber-optic connecting cables, which involves the afore-mentioned risks.

It is desirable in case of these embodiments of casings for fiber-optic equipment including an air cleaning filter system to use a rather small height of the front panel for both guiding fiber-optic connecting cables and accessing the filter system without the risk or with a reduced risk to affect the transmission characteristics of the respective transmission links by moving the cables or even breaking or disconnecting the fibers from the front panel.

It is thus an object of the invention to provide a filter system for cleaning the air of an enclosure to be ventilated, especially for fiber-optic equipment, which is configurable such that only a minimum space in a given direction is required in order to access the filter system for changing the filter element, even if the ventilation opening does not extend in a plane parallel to the given direction. It is a further object of the invention to provide an enclosure including such a filter system.

SUMMARY OF THE INVENTION

The invention is based on the notion that the insertion opening for inserting the filter housing into the insertion shaft located proximate to the ventilation opening does not necessarily need to extend in a plane parallel to the ventilation opening, if the system is designed such that the filter housing can be inserted into the insertion shaft in a first rotational orientation or position (with respect to the direction of insertion) and rotated into a second rotational orientation which corresponds to the rotational orientation of the working position of the filter housing after the filter housing has passed the insertion opening. In this way, the filter system can be adapted to use a given however large enough space in front of the filter system or the enclosure, respectively, even if this space is insufficient in directly inserting the filter housing into the insertion shaft in the rotational orientation of the working position.

According to a preferred embodiment of the invention, the insertion means includes a neck portion defining the insertion opening, the axial length of the neck portion corresponding to the axial length of the handle. In this way, the neck portion can be used as guiding means so that the filter housing can be inserted along a given direction of insertion defined by the neck portion. In addition, the outer front face of the neck portion can be used as mechanical stop for a grip element of the handle being used for manually rotating the filter housing during insertion.

The filter housing preferably has an essentially constant cross-section in planes perpendicular to the insertion direction, and the cross-section of the insertion opening (in planes perpendicular to the insertion direction) preferably reveals the same shape, so that the filter housing can be inserted in a predefined rotational position.

The handle preferably includes a shaft mounted to the filter housing and a grip element provided at the opposite end of the shaft, the grip element being adapted to close the insertion opening when the filter housing is in its working position. In this way, the intrusion of dust or dirt into the enclosure can be avoided at least if the neck portion reveals a circumferentially closed wall. Moreover, if the cross-sectional shape of the grip element equals the shape of the neck portion at its outer front face, the user is informed about the rotational position of the insertion part or the filter housing, respectively, by the rotational position of the grip element relative to the front face of the neck portion. In case the grip element is not in an aligned position with respect to the front face of the neck portion, this signals that the filter housing has not reached its working position.

Moreover, the grip element and the form of the neck portion can be designed such that the user is informed when the rotational position of the filter housing corresponds to the first rotational position allowing the insertion or pulling out of the insertion part into the insertion shaft.

According to a preferred embodiment of the invention, the insertion means includes a preferably plate-like sealing element having an opening corresponding to the cross-section of the rear portion of the filter housing, the sealing element being arranged such that the rear portion of the filter housing engages the sealing element when the insertion part is rotated from the first rotational position into the second rotational position and that the sealing element essentially seals the insertion opening in the working position. Thus, the intrusion of dust or dirt by sucking in unfiltered air is avoided.

The plate-like sealing element may reveal a circular outer shape and may be rotatably held by a plate-like guide element having a circular recess in which the sealing element is rotatably guided.

The insertion means may further include an inner guide element provided at the side of the sealing element facing the inner portion of the enclosure and an outer guide element provided at the opposite side of the sealing element, both guide elements having a recess configured such that the plate-like sealing element is sandwiched and rotatably held between the guide elements, the recess of the outer guide element being further configured such that it allows for the insertion of the filter housing in its first rotational position, and the recess of the inner guide element being further configured such that it allows for the insertion and rotational movement of the filter housing. In this way, simple and cheap construction and manufacturing of the rotatable sealing element are achieved.

According to another embodiment of the invention, the insertion means comprises an engaging element provided at the end portion of the filter housing opposite the handle, the engaging element being adapted to engage a complementary engaging element provided at an inner portion of the insertion shaft in an engaging status which is at the latest reached when the insertion part has been fully inserted in the insertion direction, the engaging element and the complementary engaging element enabling, in their engaging status, the rotational movement of the insertion part from the first into the second rotational position. This guarantees a smooth insertion of the insertion part into the insertion shaft and a secure retention of the insertion part in its working position.

The handle may be configured such that the filter housing is kept under prestress in the direction of insertion when the insertion part has been fully inserted in the insertion direction, at the latest when the working position has been reached. This prevents the insertion part from small axial movements and/or producing noise in its working position which may otherwise arise due to vibrations of the enclosure.

In a further embodiment of the invention, the handle comprises a radially extending pin being adapted to engage a catch spring included by the insertion means when the insertion part is in its working position. In this way, the insertion part is secured against inadvertent movements and securely fixed in its working position.

The handle may comprise a telescopic shaft having a first and a second telescope element being engaged by a spring element which forces the two telescope elements into an end position in which the maximum length of the handle is reached, the first telescope element being connected to the filter housing and comprising an elongate recess through which the pin extends, the radially extending pin being connected to the second telescope element. Thus, the pin which is attached to the second telescope element and which extends through the recess provided in the first telescope element serves as an end stop. The length of the recess in the direction of the axis of the telescope shaft determines the maximum variation of the telescope length. In a specific embodiment, the first telescope element may be realized as a hollow cylinder (of arbitrary cross-section) and may encompass the second telescope element which may be a solid element having a corresponding cross-section so that it is guided within the first telescope element.

In a preferred embodiment, the insertion opening has a rectangular cross-section corresponding to a respective rectangular cross-section of the filter housing of the insertion part, and the angular distance between the first and second rotational position is 90 degrees. This allows, for example, to provide a rectangular insertion opening with its longer axis arranged horizontally at a front panel of rather low (vertical) height so that the insertion part can be inserted with a respective "horizontal" orientation of the filter housing. After the filter housing has been fully inserted through the insertion opening, the insertion part can be rotated by 90 degrees about an axis parallel to the insertion direction into the working position of the filter housing, in which the filter housing is positioned vertically (with its longer axis being vertical) within the respective insertion shaft, which may be adjacent to a ventilation opening provided in a vertical sidewall of the enclosure.

According to the preferred embodiment, the neck portion extends outside the enclosure and comprises cable guide means defining at least one cable guiding area located at the outer circumference of the neck portion. This ensures that the cables need not to be moved when the insertion part is pulled out or slid in.

These and other advantages and features of the invention will be apparent from the following description of illustrative embodiments, considered along with the accompanying drawings.

DESCRIPTION OF ILLUSTRATIVE EMBODIMENTS

Figure 1:
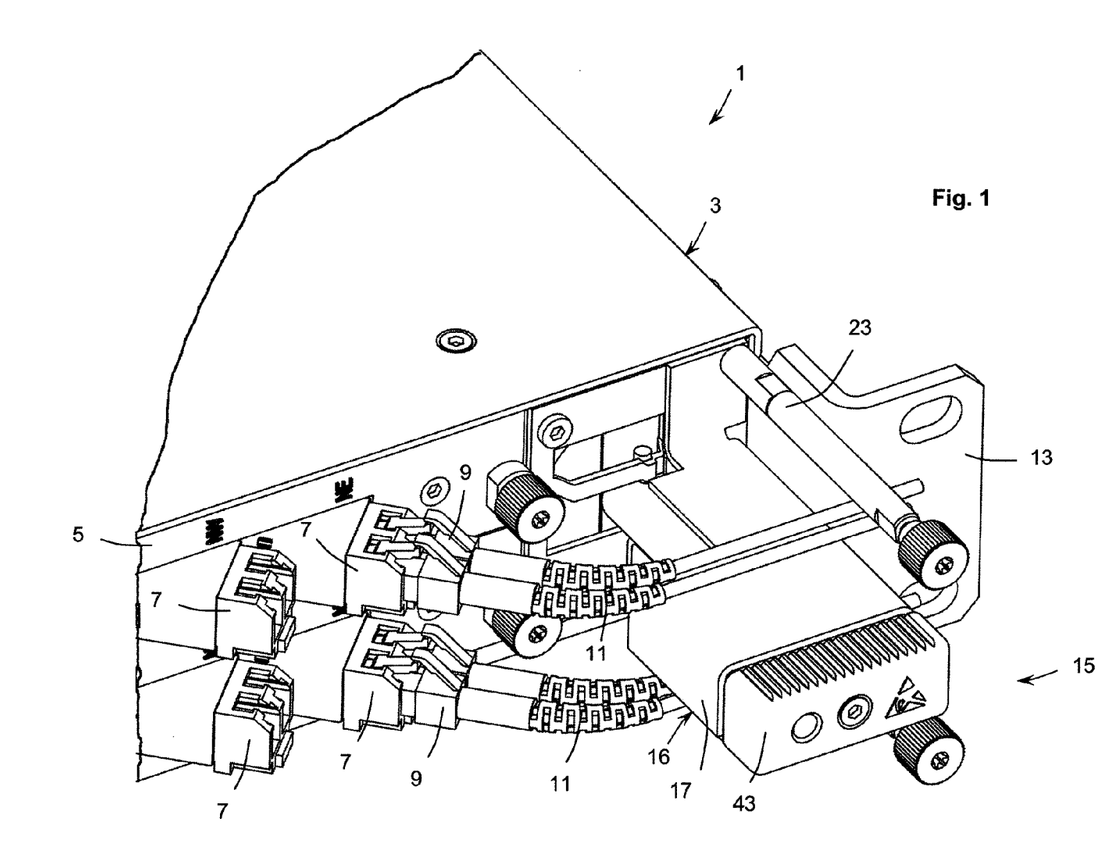
FIG. 1 a perspective view of the right front portion of an enclosure of a fiber-optic equipment including a filter system according to a preferred embodiment of the invention, the insertion part being in its working position.

FIG. 1 shows a fiber-optic equipment 1 comprising an enclosure or casing 3. At a front panel 5 of the casing 3, a plurality of jacks 7 are provided, each of the jacks 7 adapted to receive a fiber-optic connector 9 of a fiber-optic cable 11. The jacks 7 are provided in a slant manner such that the direction of insertion of the respective connector 9 is horizontal but inclined to the right side of the casing. This facilitates the guiding of the cables 11 in front of and close to the front panel 5 to the right. This allows stacking such fiber-optic equipment one over the other in a mounting rack without problems of interfering cables if a casing is to be taken out or a further casing is to be mounted into the rack. For mounting the casing 3 in a rack, fastening brackets 13 are provided at the front outer side walls of the casing. The casing 3 includes an air filter system 15 provided at the right side of the casing 3 which, within the respective area of the front panel 5, also takes over the function of the front panel, namely, to essentially seal the casing against the intrusion of unfiltered air. The filter system 15 comprises an insertion means 16 for inserting an insertion part 25 (FIG. 3) into an insertion shaft 18 (FIG. 2) provided within the casing 3. The casing has in its outer right side wall a ventilation opening 20 (FIG. 4) being associated with the insertion shaft 18 located proximate to the ventilation opening 20.

Figure 2:
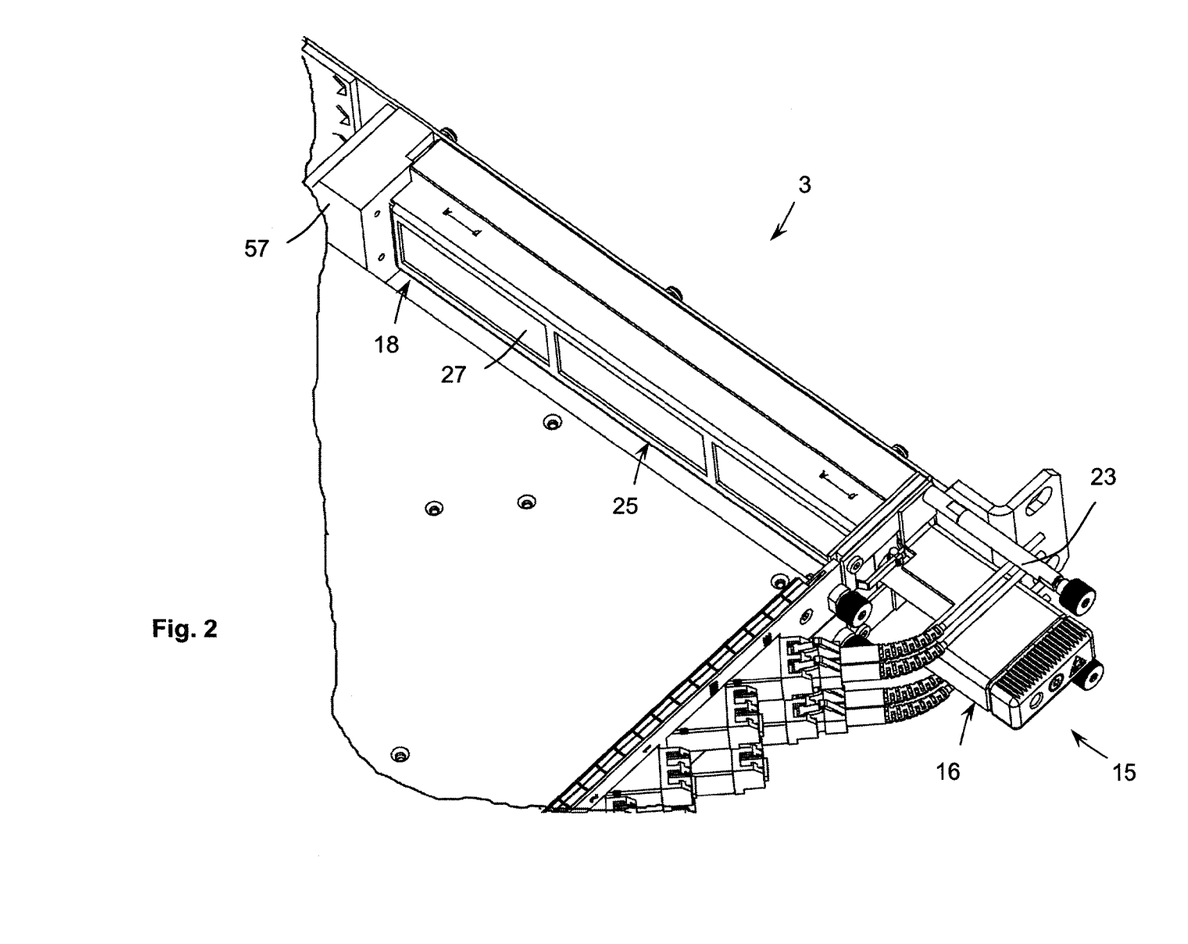
FIG. 2 a similar perspective view as shown in FIG. 1 without the top wall of the enclosure, the filter housing being in its working position.
Figure 3A:
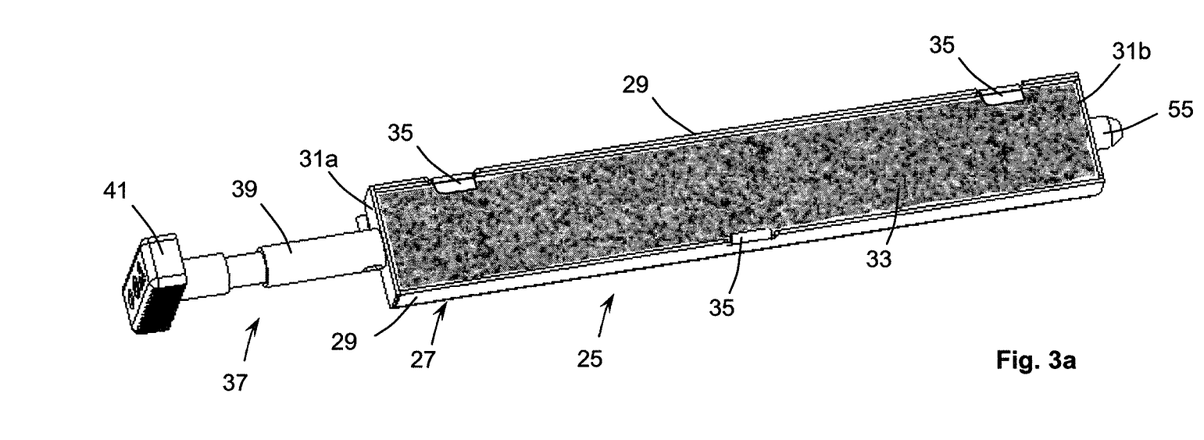
FIG. 3 perspective views of the insertion part of the filter system shown in FIGS. 1 and 3 in its assembled status (FIG. 3a) and in an exploded status (FIG. 3b)
Figure 3B:
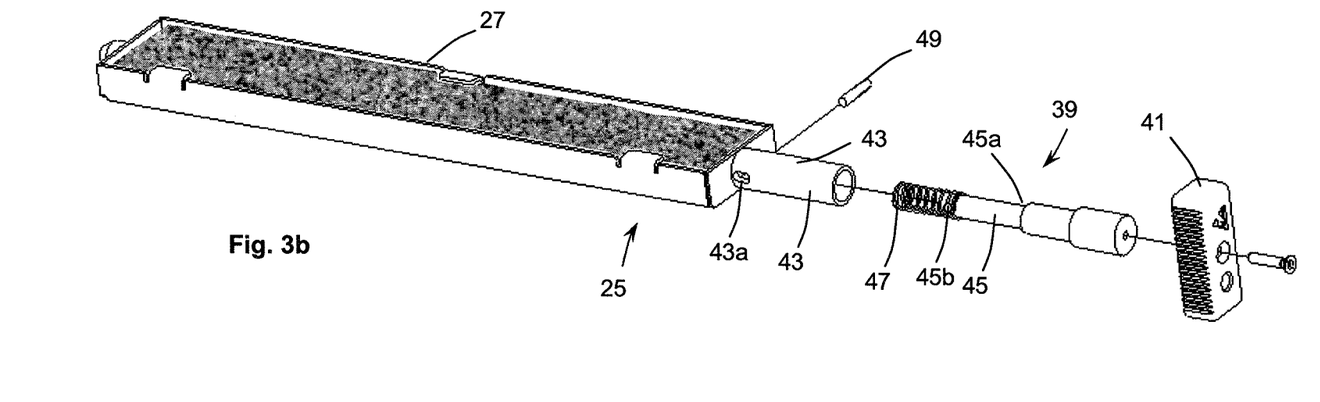
Figure 4:
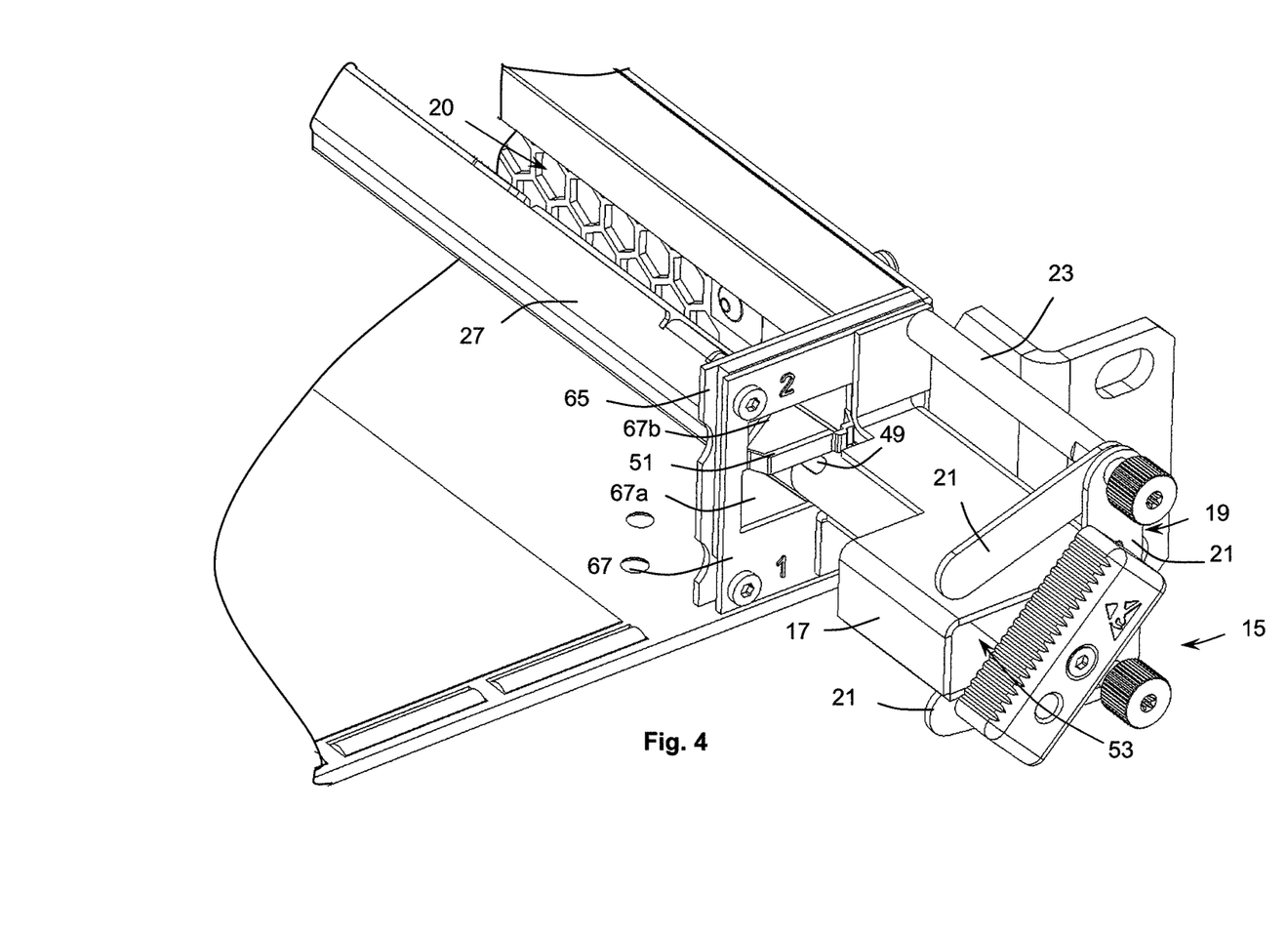
FIG. 4 an enlarged perspective view of the open front portion of the embodiment shown in FIGS. 1 to 3, the filter housing being in a 45° position.
Figure 5:
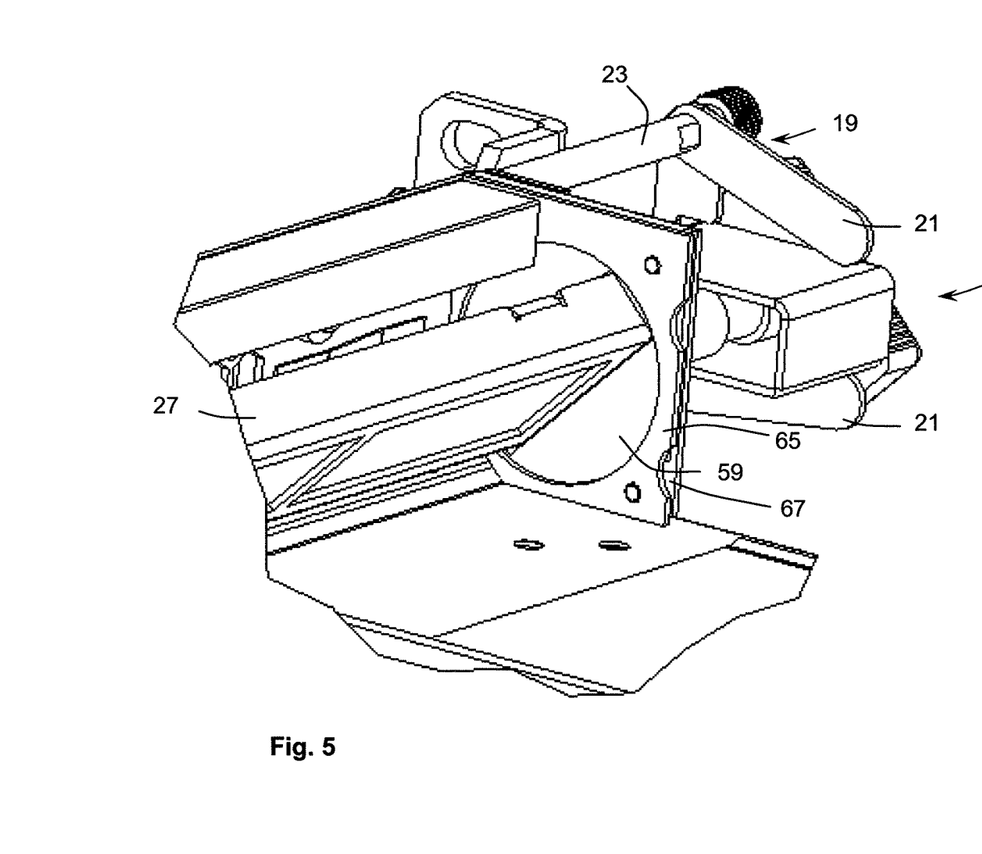
FIG. 5 an enlarged perspective inner view of the portion shown in FIG. 4, the filter housing being in a 45° position.
Figure 7:
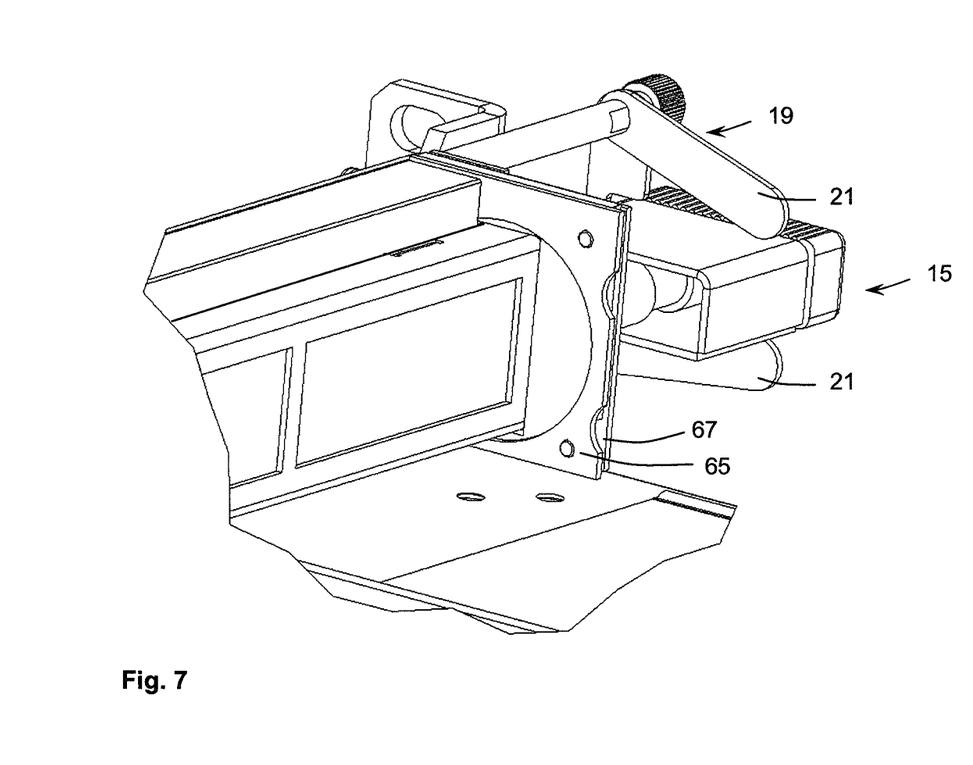
FIG. 7 an enlarged perspective inner view of the portion shown in FIG. 4, the filter housing being in its working position.

The insertion means 16 comprises a neck portion 17 extending rectangularly from the front side of the casing 3. The length of the neck portion 17 is preferably chosen such that it fully extends through the region in front of the front panel 5 needed to guide the cables 11 aside from the casing 3. As shown in FIGS. 1 and 2, the cables are guided in the region above and below the neck portion 17. FIGS. 4, 5 and 7 show additional guiding means 19 for keeping the cables within the space limited by the front panel and limiting elements 21 of the guiding means 19. The limiting elements 21 may be realized (as shown in the Figures) as plates or arms extending in a plane parallel to the front panel being mounted to the casing by distance rods 23. Due to the guiding means 19, the cables are kept in the respective region in front of the front panel 5 and do not impede the process of changing the filter element 33 (FIG. 3) as described below.

FIG. 2 shows the open casing 3 and its filter system 15 without the internal electronic or optic equipment. The insertion part 25 shown in FIGS. 3a and 3b is kept in its working position, which means that a filter housing 27 of the insertion part 25 is affixed in its working position.

As apparent from FIG. 3, the insertion part 25 comprises a filter housing 27 having a rectangular structure with elongate side walls 29 and shorter front and rear walls 31a, 31b. The bottom of the filter housing 27 reveals recesses which enable the passing of air through a large extent of the bottom area. A filter element 33, which is encompassed by the filter housing, rests on supporting areas of the bottom of the filter housing 27 provided adjacent to the side walls 29 and the front and rear walls 31a, 31b. Further rests are realized as narrow stiffening members 35 connecting the side walls 29. On its upper side the filter element 33 is retained with the filter housing by retainer means 35, which may be realized as portions of the sidewalls and/or rear walls crimped inwardly, so that the flexible filter element 33 can be inserted in the interior of the filter housing 27.

The insertion part 25 further comprises a handle 37 consisting of a shaft 39 connected to the front wall 31a and a grip element 41 connected to the other end of the shaft 39. The shaft 39 may be designed as telescopic shaft comprising a first telescope element 43 connected to the front wall 31a which is a hollow cylindrical element encompassing a second telescope element 45 in the form of a cylindrical pin. A spring element 47 surrounds the pin-like second telescope element 45 and engages, with one end thereof, a step or shoulder 45a of the pin-like element. The other end of the spring element 47 engages a shoulder provided in the inner surface of the first telescope element 43 (not shown). A transverse elongated recess 43a is provided in the inner end of the pin-like first telescope element 43. Additionally, a transversely extending bore 45b is provided in the inner end of the second telescope element 45.

The handle 37 is assembled by sliding the spring element 47 onto the inner end of the second telescope element 45 and inserting this inner end into the cylindrical first telescope element 43 until the transverse bore 45b in the second telescope element 45 reaches the transverse recess 43a. Then, a pin 49 is inserted through the recess 43a into the bore 45b such that it radially extends for a given length which may serve to engage a catch spring 51 (FIG. 4) included by the insertion means when the insertion part is in its working position.

Thus, the telescope shaft 39 is designed such that a pre-stress acts upon the filter housing 27 when the insertion part is in its working position (shown in FIGS. 1, 2 and 7), as the axial position of the insertion part in the direction of the insertion movement (or the axis of the neck portion 17) is fixed by the pin 49 and the catch spring 51 so that the spring element 47 exerts a pre-stressing force onto the first telescope element 43 and the filter housing 27 (the respective movement being limited by the elongated recess 43a and the pin 49).

As apparent from FIG. 4, the insertion part 25 must be rotated counterclockwise by 90 degrees in order to move the filter housing 27 from its working position (in which the filter housing is fixed upright within the insertion shaft 18 (FIG. 2)) to a horizontal position in which the cross-section of the filter housing 27 is aligned with the cross-section of the insertion opening 53 of the insertion means 16 defined by the neck portion 17. In this regard, the term "cross-section of the filter housing" means the cross-section of the filter housing 27 in planes perpendicular to its longitudinal axis (which is parallel to the side walls 29) or perpendicular to the direction of insertion. In the same way, the term "cross-section of the insertion opening" means the cross-section of the opening 53 in planes perpendicular to the direction of insertion (or perpendicular to the longitudinal axis of the neck portion 17).

In the aligned position, the insertion part with its filter housing can be pulled out of the insertion means 16 comprising the neck portion 17 defining the square insertion opening, the cross-section of which is slightly bigger than the square cross-section of the filter housing 27.

It is of course not mandatory that the shape of the cross-section of the filter housing 27 equal the shape of the cross-section of the insertion opening. However, the shape of the cross-section of the insertion opening in planes perpendicular to the insertion direction shall be configured such that the filter housing of the insertion part can be inserted into the insertion shaft in a predefined first rotational insertion position, only, and that the filter housing can be rotated from the first rotational insertion position into a second rotational position corresponding to the working position after the filter housing of the insertion part has been fully inserted through the insertion opening.

Inserting the insertion part 25 into the insertion shaft 18 is effected vice versa. The front of the insertion part 25, i.e. the cross-section of the filter housing 27, is aligned with the insertion opening 53 and is then slid in until an engaging element 55 in the form of a pin provided at the rear wall 31b of the filter housing 27 engages a complementary engaging element 57 in the form of a recess provided in an inner wall of the casing 3. The pin 55 and the complementary engaging element 57 cooperate to guide the insertion part in the longitudinal direction and further enable to pivot the insert element from its rotational (horizontal) insertion position to the (vertical) working position.

As apparent from FIG. 3, it is advantageous if the outer vertical dimension of the handle 37 in the longitudinal region of the neck portion 17 (if the insertion part fully inserted in the longitudinal direction) essentially equals the vertical dimension of the filter housing 27. If the outer diameter of the first telescope element 43 equals the height of the side walls 29, 31 of the filter housing the insertion part 25 is still smoothly guided in the neck portion 17 even if the filter housing 27 has almost passed the neck portion 17.

As the grip element 41 has a cross-section (in planes perpendicular to the longitudinal axis) which is essentially equal to the cross-section of the neck portion 17 (of course the cross-section of the grip element might also be bigger) the grip element 41 seals the front opening of the neck portion 17 when the insertion part 25 is in its working position. Moreover, the elongated cross-section of the grip element 41 serves as indicator for the rotational position of the insertion part 25. If the grip element indicates a 90 degrees position, the insert element can be pulled out of the insertion shaft 18.

Essentially in the plane of the front panel, the insertion means comprise a plate-like sealing element 59 having an opening 61 corresponding to the cross-section of the rear portion of the filter housing. The sealing element 59 (and of course the longitudinal position of the complementary engaging element 57) is arranged such that the rear portion of the filter housing 27 engages the sealing element 59 when the insertion part 25 is rotated from the rotational insertion position into the rotational position of the working position. In this way, the sealing element 59 essentially seals the insertion opening 53 during inserting the insertion part 25 and in the working position.

Figure 6:
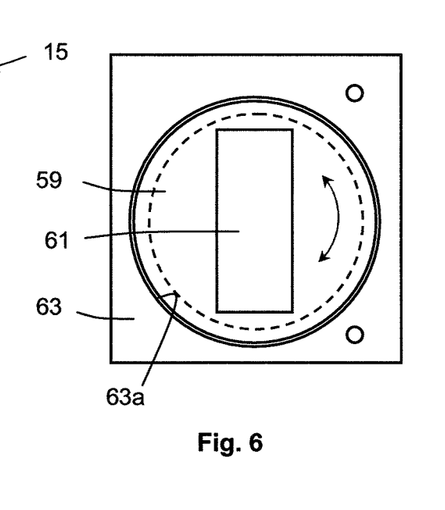
FIG. 6 the sandwich-like construction of the rotatable sealing element used in the embodiment shown in FIGS. 1 to 5.

As is apparent from FIG. 6, the plate-like sealing element 59 has a circular outer shape and is rotatably held by a plate-like guide element 63 having a circular recess 63a in which the sealing element 59 is rotatably guided.

The insertion means further includes an inner guide element 65 provided at the side of the sealing element 59 facing the inner portion of the enclosure 3 and an outer guide element 67 provided at the opposite side of the sealing element 59. Each of the guide elements 65, 67 comprises a recess configured such that the plate-like sealing element 59 is sandwiched and rotatably held between the guide elements 65, 67. The recess of the outer guide element 67 is configured such that it allows for the insertion of the filter housing 27 and may be equal to and aligned to the cross-section of the insertion opening 53. The recess of the inner guide element 65 is configured such that it not only allows for the insertion but also for the rotational movement of the filter housing 27.

As shown in FIG. 4, the outer guide element 67 has a lower recess 67a that corresponds to the insertion opening 53. The further recess 67b facilitates the manufacturing of the catch spring 51 which may be manufactured by a cold forming process after the two recesses 67a, 67b have been punched out of a metal sheet. In order to enable the pin 49 to engage with the catch spring 51 the neck portion 17 reveals a recess on the left side adjacent to the front panel 5 or the outer guide element 67, respectively.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described illustrative embodiments are intended to illustrate the principles of the invention, but not to limit the scope of the invention. Various other embodiments and modifications to these illustrative embodiments may be made by those skilled in the art without departing from the scope of the present invention.

| 1 | fiber-optic equipment |
|---|---|
| 3 | enclosure, casing |
| 5 | front panel |
| 7 | jack |
| 9 | fiber-optic connector |
| 11 | fiber-optic cable |
| 13 | bracket |
| 15 | air filter system |
| 16 | insertion means |
| 17 | neck portion |
| 18 | insertion shaft |
| 19 | guiding means |
| 20 | ventilation opening |
| 21 | limiting element |
| 23 | distance rods |
| 25 | insertion part |
| 27 | filter housing |
| 29 | side walls |
| 31a | front wall |
| 31b | rear wall |
| 33 | filter element |
| 35 | retainer means |
| 37 | handle |
| 39 | shaft |
| 41 | grip element |
| 43 | first telescope element |
| 43a | transverse elongated recess |
| 45 | second telescope element |
| 45a | shoulder |
| 45b | transverse bore |
| 47 | spring element |
| 49 | pin |
| 51 | catch spring |
| 53 | insertion opening |
| 55 | engaging element/pin |
| 57 | complementary engaging element |
| 59 | sealing element |
| 61 | opening |
| 63 | guide element |
| 65 | inner guide element |
| 67 | outer guide element |
| 67a | recess |
| 67b | recess |

The invention claimed is:

1. A filter system for cleaning the air of an enclosure to be ventilated, the enclosure including a ventilation opening and being associated with an insertion shaft located proximate to the ventilation opening, the filter system including:
    (a) an insertion part including a filter housing for accommodating at least one filter element and further including a handle for inserting the insertion part into the insertion shaft, the filter housing being configured so as to cover the ventilation opening when the filter housing is in a working position within the insertion shaft;
    (b) an insertion means provided at a first end portion of the insertion shaft;
    (c) an insertion opening included in the insertion means and through which the insertion part is receivable into the insertion shaft in an insertion direction; and
    (d) wherein the insertion opening is stationary with respect to the enclosure, and the shape of the cross-section of the insertion opening in planes perpendicular to the insertion direction is configured such that the filter housing of the insertion part can be inserted into the insertion shaft in a predefined first rotational position, only, and wherein the filter housing can be rotated from the first rotational position into a second rotational position corresponding to a rotational orientation of the filter housing in the working position after the filter housing has been fully inserted through the insertion opening.

2. The filter system according to claim 1 wherein, the insertion means includes a neck portion defining the insertion opening, the axial length of the neck portion corresponding to the axial length of the handle.

3. The filter system according to claim 1 wherein the filter housing has an essentially constant cross-section in planes perpendicular to the insertion direction and wherein the cross-section of the insertion opening has the same shape.

4. The filter system according to claim 1 wherein the handle includes a shaft mounted to the filter housing and a grip element provided at the opposite end of the shaft, the grip element being adapted to close the insertion opening when the filter housing is in its working position.

5. The filter system according to claim 1 wherein the insertion means includes a sealing element having an opening corresponding to the cross-section of a rear portion of the filter housing, the sealing element being arranged such that the rear portion of the filter housing engages the sealing element when the insertion part is rotated from the first rotational position into the second rotational position and such that the sealing element seals the insertion opening when the filter housing is in the working position.

6. The filter system according to claim 5 wherein, the sealing element has a circular outer shape and is rotatably held by a guide element having a circular recess in which the sealing element is rotatably guided.

7. The filter system according to claim 6 wherein, the insertion means further includes an inner guide element provided at the side of the sealing element facing the inner portion of the enclosure and an outer guide element provided at the opposite side of the sealing element, both the inner guide element and the outer guide element having a recess configured such that the sealing element is sandwiched and rotatably held between the first guide element and the second guide element, the recess of the outer guide element being further configured such that it allows for the insertion of the filter housing in its first rotational position, and the recess of the inner guide element being further configured such that it allows for the insertion and rotational movement of the filter housing.

8. The filter system according to claim 1 wherein the insertion part comprises an engaging element provided at the end portion of the filter housing opposite the handle, the engaging element being adapted to engage a complementary engaging element provided at an inner portion of the insertion shaft in an engaging status which is reached at least when the insertion part has been fully inserted into the insertion shaft in the insertion direction, the engaging element and the complementary engaging element enabling, in their engaging status, the rotational movement of the insertion part from the first rotational position into the second rotational position.

9. The filter system according to claim 8 wherein the handle is configured such that the filter housing is kept under prestress in the direction of insertion when the insertion part has been fully inserted into the insertion shaft in the insertion direction, at the latest when the working position has been reached.

10. The filter system according to claim 1 wherein the handle includes a radially extending pin being adapted to engage a catch spring associated with the insertion means when the insertion part is in its working position.

11. The filter system according to claim 10 wherein the handle comprises a telescopic shaft having a first telescope element and a second telescope element being engaged by a spring element forcing the two telescope elements into an end position in which the maximum length of the handle is reached, the first telescope element being connected to the filter housing and including an elongate recess through which the pin extends, the radially extending pin being connected to the second telescope element.

12. The filter system according to claim 1 wherein the insertion opening has a rectangular cross-section and the angular distance between the first rotational position and the second rotational position is 90 degrees.

13. The filter system according to claim 2 wherein the neck portion extends outside the enclosure and includes cable guiding means defining at least one cable guiding area located at the outer circumference of the neck portion.

14. An enclosure for electronic or fiber-optic equipment, the enclosure including:
(a) a ventilation opening;
(b) an insertion shaft located proximate to the ventilation opening;
(c) an insertion part including a filter housing for accommodating at least one filter element and further including a handle, the filter housing being configured so as to cover the ventilation opening when the filter housing is in a working position within the insertion shaft;
(d) an insertion opening provided at a first end portion of the insertion shaft, the insertion part being insertable through the insertion opening into the insertion shaft in an insertion direction, the insertion opening being stationary with respect to the enclosure and the shape of the cross-section of the insertion opening in planes perpendicular to the insertion direction being configured such that the filter housing of the insertion part is insertable into the insertion shaft only when the filter housing is in a predefined first rotational position with respect to the insertion opening; and
(e) wherein the insertion shaft and the filter housing are configured such that once the filter housing is fully inserted through the insertion opening, the filter housing is rotatable from the first rotational position into a second rotational position corresponding to a rotational orientation of the filter housing in the working position.

15. The filter system of claim 1 wherein the filter housing defines a rectangular shape facing the ventilation opening when the filter housing is in the working position, and has a rectangular cross-section in planes perpendicular to the insertion direction.

* * * * *